(12) United States Patent
Chu

(10) Patent No.: US 12,505,850 B2
(45) Date of Patent: Dec. 23, 2025

(54) REAL-TIME AUDIO PROCESSING SYSTEM, REAL-TIME AUDIO PROCESSING PROGRAM, AND METHOD FOR TRAINING SPEECH ANALYSIS MODEL

(71) Applicant: REALTEK SEMICONDUCTOR CORP., Hsinchu (TW)

(72) Inventor: Yen-Hsun Chu, Hsinchu (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 412 days.

(21) Appl. No.: 17/972,030

(22) Filed: Oct. 24, 2022

(65) Prior Publication Data
US 2024/0046949 A1 Feb. 8, 2024

(30) Foreign Application Priority Data
Aug. 4, 2022 (TW) .................................. 111129427

(51) Int. Cl.
 G10L 21/00 (2013.01)
 G10L 21/0272 (2013.01)
 G10L 21/0356 (2013.01)

(52) U.S. Cl.
 CPC ...... G10L 21/0272 (2013.01); G10L 21/0356 (2013.01)

(58) Field of Classification Search
 CPC ....... G10L 13/00; G10L 15/16; G10L 19/008; G10L 21/02; G10L 2021/02087; G10L 21/0216; G10L 2021/02161; G10L 2021/02165; G10L 2021/02168; G10L 21/0232; G10L 21/0264; G10L 21/0272; G10L 21/028; G10L 21/0356; G10L 21/034; G10L 21/0332; G10L 21/0324;
(Continued)

(56) References Cited

U.S. PATENT DOCUMENTS

2010/0082338 A1* 4/2010 Togawa .................. G10L 21/02
                                                              704/221
2016/0105698 A1   4/2016 Tang
(Continued)

FOREIGN PATENT DOCUMENTS

CN  110019752 A  7/2019
TW  201610982 A  3/2016

OTHER PUBLICATIONS

Zhao, H., Gan, C., Rouditchenko, A., Vondrick, C., McDermott, J., & Torralba, A. (2018). The sound of pixels. In Proceedings of the European conference on computer vision (ECCV) (pp. 570-586) (Year: 2018).*

(Continued)

Primary Examiner — Edgar X Guerra-Erazo
(74) Attorney, Agent, or Firm — Birch, Stewart, Kolasch & Birch, LLP

(57) ABSTRACT

An audio real-time processing system, an audio real-time processing program product and method for training speech analysis model are provided. The speech analysis model is firstly trained to obtain, from an original audio, mask information which is used to mask the original audio to get a target audio. The system obtains a plurality of analyzed audio according to the target audio and the original audio, obtains repeated audio section according to the plurality of the analyzed and output the repeated audio section.

6 Claims, 7 Drawing Sheets

(58) Field of Classification Search
CPC ... G10L 21/0316; G10L 21/0308; G06N 3/04; G06N 3/02; G06N 3/044; G06N 3/0442; G06N 3/045; G06N 3/0455; G06N 3/0464; G06N 3/0475; G06N 3/048; G06N 3/0499; G06N 3/0895; G06N 3/088; G06N 3/09; G06N 3/091; G06N 3/092; G06N 3/094; G06N 3/096; G06N 3/0985; G06N 3/098
See application file for complete search history.

(56) References Cited

U.S. PATENT DOCUMENTS

2019/0206417 A1* 7/2019 Woodruff .............. G10L 21/028
2023/0402050 A1* 12/2023 Vilkamo ................ G10L 15/08

OTHER PUBLICATIONS

X. Han, Y. Wei and X. Xie, "An audio-visual objective quality model based on BP neutral network," 2011 International Conference on Multimedia Technology, Hangzhou, China, 2011, pp. 5277-5280 (Year: 2011).*

L.-C. Yang and A. Lerch, "Remixing Music with Visual Conditioning," 2020 IEEE International Symposium on Multimedia (ISM), Naples, Italy, 2020, pp. 181-188. (Year: 2020).*

* cited by examiner

REAL-TIME AUDIO PROCESSING SYSTEM, REAL-TIME AUDIO PROCESSING PROGRAM, AND METHOD FOR TRAINING SPEECH ANALYSIS MODEL

CROSS-REFERENCE TO RELATED APPLICATION

This non-provisional application claims priority under 35 U.S.C. § 119(a) to Patent Application No. 111129427 filed in Taiwan, R.O.C. on Aug. 4, 2022, the entire contents of which are hereby incorporated by reference.

BACKGROUND

Technical Field

The disclosure relates to audio processing and audio training, and in particular to a real-time audio processing system, a real-time audio processing program and a method for training a speech analysis model.

Related Art

At present, when adjusting the volume of a sound output device (such as a TV and a stereo), a user can only increase or decrease the output volume as a whole, but cannot adjust the target sound (such as musical instrument sound and human voice). One of the reasons is that the internal audio processing system cannot process the audio in real time.

Therefore, the inventor believes that if the audio is processed in real time, the audio enjoyment of the user will be effectively enhanced. As a result, the inventor began to think about ways of improvement.

SUMMARY

In view of the contents in the prior art, the inventor provides a real-time audio processing system, including a speech analysis model and a processor.

The speech analysis model is configured to obtain an analysis result and hidden layer state information according to an original audio. The processor is configured to perform a plurality of operations on the original audio by using the speech analysis model and correspondingly obtain a plurality of analyzed audios and the hidden layer state information; obtain a repeated audio section according to the analyzed audios; and output the repeated audio section.

The inventor also provides a method for training a speech analysis model, including:

obtaining an original audio, and transforming the original audio to obtain phase information and magnitude information; obtaining mask information according to the magnitude information and a speech analysis model; obtaining magnitude prediction information according to the magnitude information and the mask information; and adjusting the speech analysis model according to the magnitude prediction information, the phase information and a loss function.

The inventor also provides a real-time audio processing program, configured to:

perform a plurality of operations on an original audio by using a speech analysis model and correspondingly obtain a plurality of analyzed audios and hidden layer state information; and obtain a repeated audio section according to the analyzed audios.

According to the disclosure, the speech analysis model is trained by the above method, so that the well-trained speech analysis model can effectively analyze the original audio (in some examples, the speech analysis model can be used to extract the target audio and the non-target audio in the original audio), so that the processor can perform operations by using the speech analysis model to obtain the plurality of analyzed audios, and output the repeated audio section obtained from the plurality of analyzed audios. In this way, the original audio can be processed quickly to satisfy and enhance the audio enjoyment of the user.

DETAILED DESCRIPTION

Figure 1:
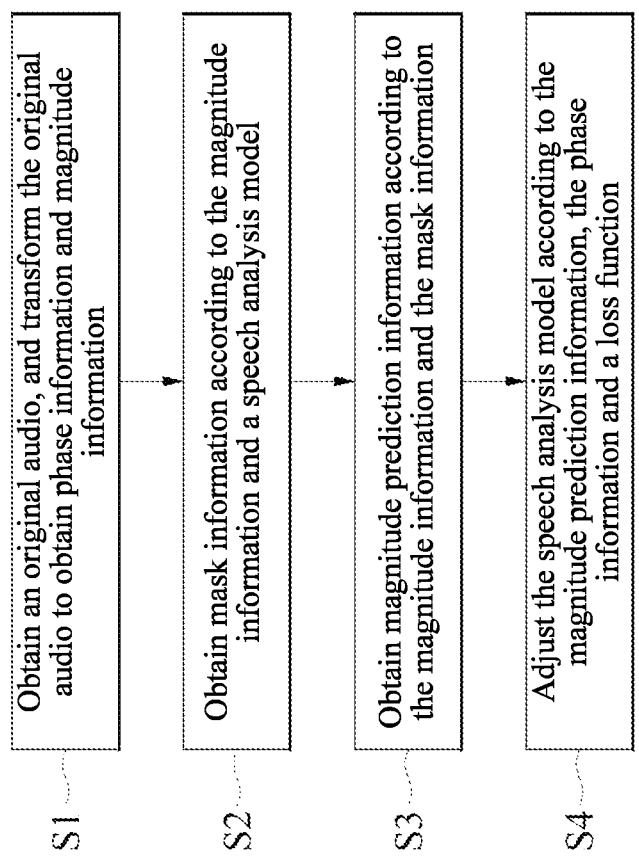
FIG. 1 is a schematic diagram showing a flow chart according to some examples of the disclosure.

FIG. 1 shows a method for training a speech analysis model of the disclosure.

The method includes:

Step S1: An original audio is obtained and transformed to obtain phase information and magnitude information. The original audio may be obtained by recording sound from an environment, a concert or the like by a sound recording element, or by capturing an audio in audio-visual information, or by mixing different types of audios. For example, a musical instrument audio, human voice and ambient sound may be mixed to obtain the original audio. For the implementation of obtaining the original audio by mixing, reference can be made to the description below. The sampling rate of the original audio may be 44.1 kHz, 48 kHz, 96 kHz or 192 kHz.

In step S1, a transform is performed on the original audio. The transform may be Fourier transform, fast Fourier transform or short-time Fourier transform (windowed Fourier transform or time dependent-Fourier transform). Taking the short-time Fourier transform as an example, during the transform, the sampling rate of the original audio is 48 kHz, the window length is 4096 sampling points, and the shifting length is 1024 sampling points. Therefore, the time of the window length is about 85.33 ms (4096/48000), and the time of the shifting length is 21.33 ms (1024/48000). This makes the speech analysis model trained by the method of the disclosure have a higher processing speed and a lower latency and also give consideration to the definition of the audio when being applied to speech recognition. The window length may be 512, 1024, 2048 or 4096 sampling points. In the foregoing example, the window length is 4 times the shifting length, then the shifting length is 128, 256, 512, or 1024 sampling points. In addition, the relationship between the window length and the shifting length is not limited thereto, and the window length may be multiple times the shifting length, such as 2 times, 8 times, 16 times, etc.

In some examples, after the Fourier transform, the original audio is transformed from the time domain to the frequency domain. Thereby, the phase information may present the relationship between the phase and the frequency in the original audio in the form of a spectrum, where the horizontal axis is frequency, and the vertical axis is phase. Similarly, the magnitude information presents the relationship between the amplitude and the frequency in the original audio in the form of a spectrum, where the horizontal axis is frequency, and the vertical axis is amplitude.

Step S2: Mask information is obtained according to the magnitude information and a speech analysis model. The mask information is used to mask part of information in the magnitude information to retain the rest of the magnitude information. For example, when the magnitude information has human voice information and musical instrument sound information, the musical instrument sound information may be selectively masked through the mask information, and the magnitude information with the human voice information is retained. In some examples, non-target mask sub-information is obtained according to the magnitude information and the speech analysis model. In some examples, target mask sub-information and non-target mask sub-information are obtained according to the magnitude information and the speech analysis model.

Step S3: Magnitude prediction information is obtained according to the magnitude information and the mask information. The magnitude information has target magnitude sub-information and non-target magnitude sub-information. Therefore, when the target mask sub-information is used to perform masking on the magnitude information, the target magnitude sub-information will be masked to obtain the non-target magnitude prediction sub-information. Similarly, the non-target mask sub-information will mask the non-target magnitude sub-information in the magnitude information to obtain the target magnitude prediction sub-information.

Step S4: The speech analysis model is adjusted according to the magnitude prediction information, the phase information and a loss function. In some examples, step S4 is to adjust parameters in the speech analysis model. For the examples of this part, reference can be made to the description below. In some examples, the parameters refer to weights that have been trained in the speech analysis model. The loss function, also known as the cost function, is used to evaluate the analysis accuracy of the speech analysis model. Therefore, a smaller value of the loss function indicates a higher accuracy of the speech analysis model. Contrarily, a larger value of the loss function indicates a lower accuracy of the speech analysis model, and the parameters need to be adjusted. For the examples of the loss function, reference can be made to the description below.

In this way, the speech analysis model 10 may be trained by the steps above, so that the mask information obtained by the analysis of the speech analysis model 10 can be effectively used to mask the information in the magnitude information, and thereby, extraction can be performed on the magnitude information by a separator 50. For example, when the original audio has human voice and musical instrument sound, the target mask sub-information may be set to mask the human voice, and the non-target mask sub-information may be set to mask the musical instrument sound. Accordingly, after the separator 50 performs masking on the magnitude information by using the target mask sub-information, the magnitude information with the musical instrument sound can be extracted to serve as the non-target magnitude sub-information. Then, when the magnitude information with the musical instrument sound and the phase information are subjected to inverse Fourier transform, an audio only with the musical instrument sound can be obtained. Similarly, after the separator 50 performs masking on the magnitude information by using the non-target mask sub-information, the magnitude information with the human voice can be extracted to serve as the target magnitude sub-information. Then, when the magnitude information with the human voice and the phase information are subjected to inverse Fourier transform, an audio only with the human voice can be obtained.

Some examples, in step S1, firstly, an original signal is subjected to offline processing or online processing. Taking the extraction of human voice as an example, the offline processing is to perform data enhancement, which produces more data by mixing more types of sound. For example, the human voice is mixed with music to obtain the original audio. For another example, from three types of sound data (human voice, music and noise), two or more types of voice data (including the human voice) are selected and mixed to obtain the original audio. The online processing is to perform data augmentation, which changes the loudness of the original audio by using a random scale, i.e., data=data*random.uniform (low, high). In some examples, low=0.75, and high=0.9. Data inversion may also be performed, i.e., data=data [::−1]. The scale is applied to measure the original audio. Therefore, different loudnesses may be obtained when different scales are used to measure the same original audio.

Figure 2:
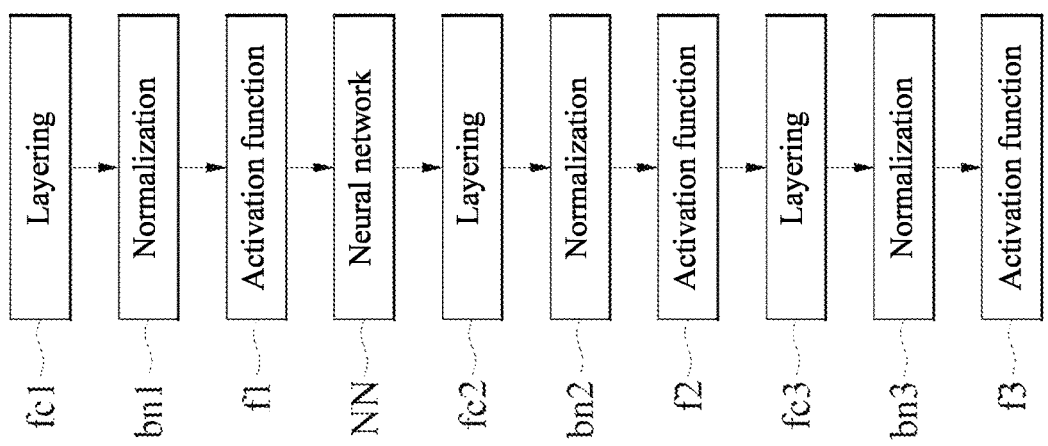
FIG. 2 is a schematic diagram showing the working of a speech analysis model according to some examples of the disclosure.

Referring to FIG. 2, in some examples, the speech analysis model 10 firstly performs layering fc1 and normalization bn1 on the original audio, then performs activation function $f1$, and processes the audio by using a neural network NN. The processed audio is repeatedly subjected to layering fc2, fc3, normalization bn2, bn3, and activation function $f2$, $f3$ to obtain the mask information. The normalization reduces the difference between samples, so as to avoid gradient vanishing and gradient explosion in the training process. The normalization may be batch normalization (BN). The activation function mainly allows the speech analysis model to learn a nonlinear relationship from data. The activation function may be step function, sigmoid function, tanh function, relu function or softmax function. The neural network may be recurrent neural networks (RNN) or a long short-term memory (LSTM). In some examples, the layering fc1, fc2, fc3 is to obtain fully connected layers, the normalization bn1, bn2, bn3 is batch normalization, the activation function $f1$, $f2$, $f3$ is relu function, and the neural network NN is a unidirectional long short-term memory, so that the trained speech analysis model can effectively obtain the mask information.

In some examples, when the mask information obtained in step S2 is the non-target mask sub-information, in step S3, the non-target mask sub-information is used to mask the non-target magnitude sub-information in the magnitude information to obtain the target magnitude prediction sub-information. Taking the obtainment of human voice as an example, the non-target mask sub-information is used to mask music, noise and other information, so that after the magnitude information is subjected to masking by the non-target mask sub-information, the human voice is retained. Next, in step S4, as shown in Formula 1 below, a frequency domain loss sub-function (loss_freq) is obtained according to the target magnitude prediction sub-information (predict_magnitude) and the target magnitude sub-information (target_magnitude). MAE is the mean absolute error (MAE).

$$\text{loss\_freq}=\text{MAE}(\text{target\_magnitude}, \text{predict\_magnitude}) \quad \text{Formula 1}$$

Then, inverse Fourier transform is performed according to the target magnitude prediction sub-information and the phase information to obtain a target predicted sub-audio (predict_signal). Next, as shown in Formula 2 below, a time domain loss sub-function (loss_time) is obtained according to the original audio (target_signal) and the target predicted sub-audio.

$$\text{loss\_time}=\text{MAE}(\text{target\_signal}, \text{predict\_signal}) \quad \text{Formula 2}$$

Finally, as shown in Formula 3, the loss function (loss) is obtained according to the time domain loss sub-function and the frequency domain loss sub-function. In some examples, alpha is 0.99.

$$\text{loss}=\text{alpha}*\text{loss\_time}+(1-\text{alpha})*\text{loss\_freq} \quad \text{Formula 3}$$

In some examples, when the mask information obtained in step S2 is the target mask sub-information and the non-target mask sub-information, taking the target being human voice and the non-target being musical sound as an example, in step S3, the target mask sub-information and the non-target mask sub-information are respectively used to perform masking on the magnitude information to obtain the target magnitude prediction sub-information and the non-target magnitude prediction sub-information. Next, in step S4, as shown in Formula 4 below, a frequency domain loss sub-function (l_f) is obtained according to the target magnitude prediction sub-information (p_v_m), the non-target magnitude prediction sub-information (p_m_m), the target magnitude sub-information (t_v_m) and the non-target magnitude sub-information (t_m_m).

$$l\_f=\text{MAE}(t\_v\_m, p\_v\_m)+\text{MAE}(t\_m\_m, p\_m\_m)+\text{MAE}(t\_v\_m+t\_m\_m, p\_v\_m+p\_m\_m) \quad \text{Formula 4}$$

Then, as shown in Formula 5 below, the original audio includes a target original sub-audio (t_v) and a non-target original sub-audio (t_m), and a time domain loss sub-function (l_t) is obtained according to the target predicted sub-audio (p_v) and the non-target predicted sub-audio (p_m);

$$l\_t=\text{MAE}(t\_v, p\_v)+\text{MAE}(t\_m, p\_m)+\text{MAE}(t\_v+t\_m, p\_v+p\_m) \quad \text{Formula 5}$$

Next, as shown in Formula 6 below, the loss function (loss) is obtained according to the time domain loss sub-function and the frequency domain loss sub-function.

$$\text{loss}=\text{alpha}*l\_t+(1-\text{alpha})*l\_f \quad \text{Formula 6}$$

Figure 3:
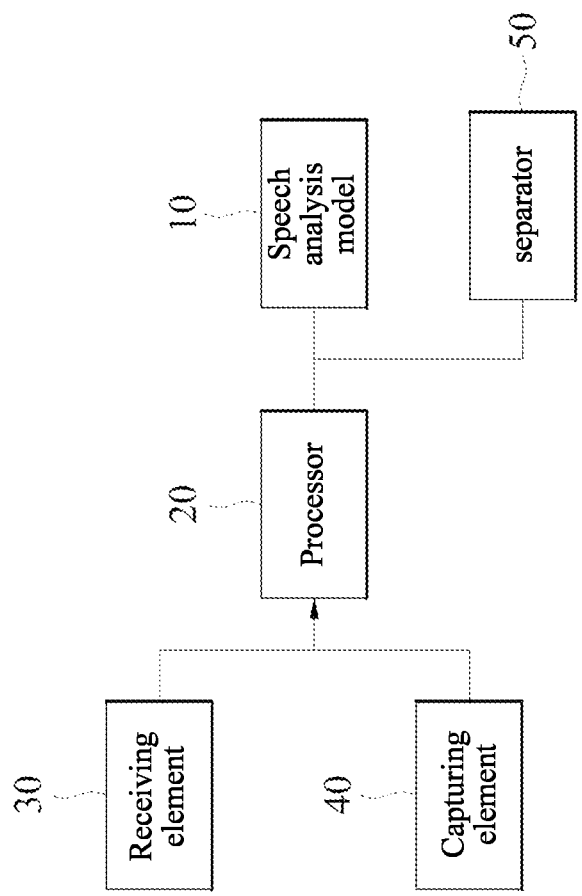
FIG. 3 is a block diagram showing connection of elements according to some examples of the disclosure.
Figure 4:
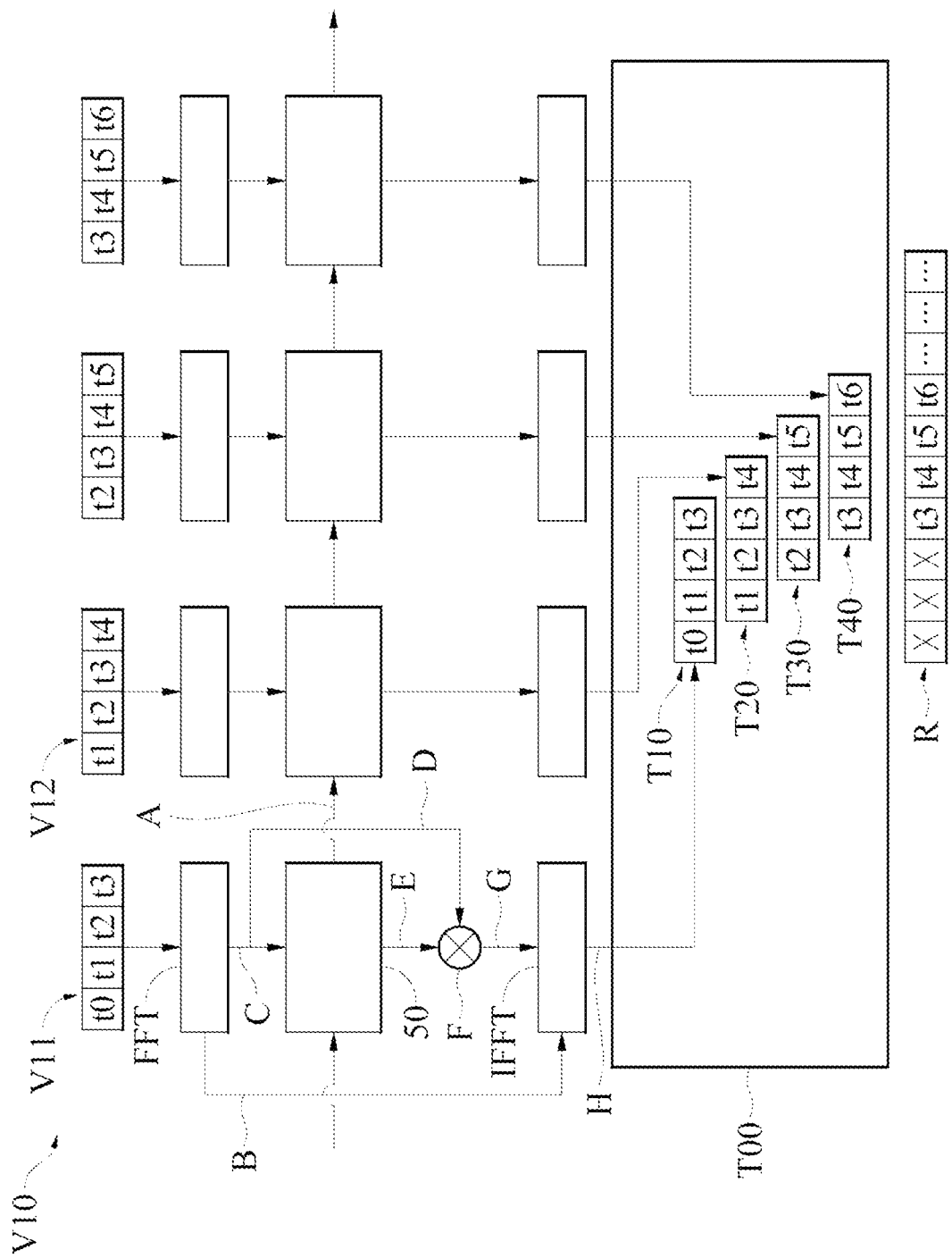
FIG. 4 is a schematic diagram showing operations according to some examples of the disclosure.

Referring to FIG. 3 and FIG. 4, after introducing the method for training the speech analysis model 10, the disclosure provides a real-time audio processing system and a real-time audio processing program thereof by using the trained speech analysis model 10. The real-time audio processing system includes a speech analysis model 10 and a processor In addition, it should be stated first that in FIG. 4, arrow A indicates transmission of the hidden layer state information, arrow B indicates transmission of the phase information, arrows C and D indicate transmission of the magnitude information, arrow E indicates transmission of the mask information, arrow F indicates that the mask information performs masking on the magnitude information, arrow G indicates transmission of the magnitude information subjected to masking, and arrow H indicates transmission of the analyzed audios.

Referring to FIG. 3 and FIG. 4, the speech analysis model 10 is configured to obtain an analysis result and hidden layer state information according to an original audio. In some examples, the analysis result is the mask information, and the separator 50 performs extraction on the magnitude information by using the mask information. For the implementation principle and related operation manners of this part, reference can be made to the method for training the speech analysis model described above, which will not be repeated here.

Referring to FIG. 4, the processor 20 is configured to perform a plurality of operations on an original audio by using the speech analysis model 10 and correspondingly obtain the plurality of analyzed audios TOO and the hidden layer state information; obtain a repeated audio section R according to the analyzed audios; and output the repeated audio section R. In the operations, during the analysis process using the speech analysis model 10, the processor 20 uses the hidden layer state information generated in the previous analysis process as an input layer for the next analysis process using the speech analysis model 10. In some examples, the operation refers to a long short-term memory (LSTM) or a recurrent neural network (RNN).

As can be seen from above, by using the disclosure, the original audio can be processed in real time, for example, the target sound can be extracted from the original audio in real time, or the volume of the target sound in the original audio can be adjusted in real time, or the volume of the target sound and the volume of the non-target sound can be adjusted at the same time to highlight the target sound. For example, by using the disclosure, the volume of the musical instrument audio may be lowered, and the volume of the human voice may be kept unchanged or increased, so that the human voice in the song can be highlighted.

Referring to FIG. 3, in some examples, the real-time audio processing system further includes a receiving element 30 and a capturing element 40. The receiving element 30 is configured to receive a volume adjustment command sent by a command input element. The volume adjustment command includes a target volume adjustment command. For example, when the user wants to adjust the human voice in the video, the target volume is the human voice volume. Similarly, when the user wants to adjust the musical instrument volume or the ambient volume, the target volume is the corresponding musical instrument volume or ambient volume. In some examples, the capturing component 40 is configured to capture an audio in an audio-visual data (for example, a television video) as an original audio. No matter in what form the volume adjustment command is transmitted, any one that can send the volume adjustment command is the command input element referred to in this specification. In some examples, the command input element may be a keyboard or a remote control, or may enable a smart phone to send the volume adjustment command to the receiving element by the aid of application software of the smart phone. The transmission may be by means of a wireless network, infrared, Bluetooth, etc.

Referring to FIG. 4, in some examples, before the processor 20 performs operations on a video sound by using the speech analysis model 10, the processor 20 divides the video sound into a plurality of continuous original sub-audio groups V10 at time intervals. Each original sub-audio group V10 includes a plurality of sub-audios (t0, t1, t2, t3, ..., tn). Taking FIG. 4 as an example, the first original sub-audio group V11 includes a plurality of continuous sub-audios (t0, t1, t2, t3), and the second original sub-audio group V12 includes a plurality of continuous sub-audios (t1, t2, t3, t4), such that the tail signal in the original sub-audio group V10 is the same as the head signal of the next original sub-audio group V10. As can be seen from above, during each analysis process of the original sub-audio group, one part of the sub-audios in the previous original sub-audio group are retained, and the other part of the sub-audios are removed and replaced with the same number of other sub-audios, which is helpful to the efficiency of subsequent speech analysis. In addition, the number of the sub-audios removed each time is not limited to the above, and may be two or three, or may be adjusted and changed according to the number of the original sub-audio groups. This example is described by taking one sub-audio removed each time as an example. In some examples, the data volume of the sub-audio is 1024 sampling points at a sampling frequency of 48 KHz (21.33 ms).

When the purpose of the real-time audio processing system is to output the target audio, in the first operation, the processor 20 performs the operation on the first original sub-audio group V11 by using the speech analysis model 10 and the separator 50. The operation manner is as described above and will not be repeated here. After the operation, a first analyzed audio T10 and hidden layer state information are obtained. Next, in the second operation, the processor 20 uses the hidden layer state information obtained by the first operation and the second original sub-audio group V12 as the input, and performs analysis by using the speech analysis model 10 to obtain a second analyzed audio T20. The operation is repeated in this way to obtain a third analyzed audio T30, a fourth analyzed audio T40, . . . , and then, the overlapping part of the analyzed audios T10-T40 is extracted as the repeated audio section R and output as the target audio. In some examples, the repeated audio section R is extracted by an overlap-add method. For the Fourier transform FFT and the inverse Fourier transform shown in FIG. 4, reference can be made to the above, and details will not be repeated here.

Figure 5:
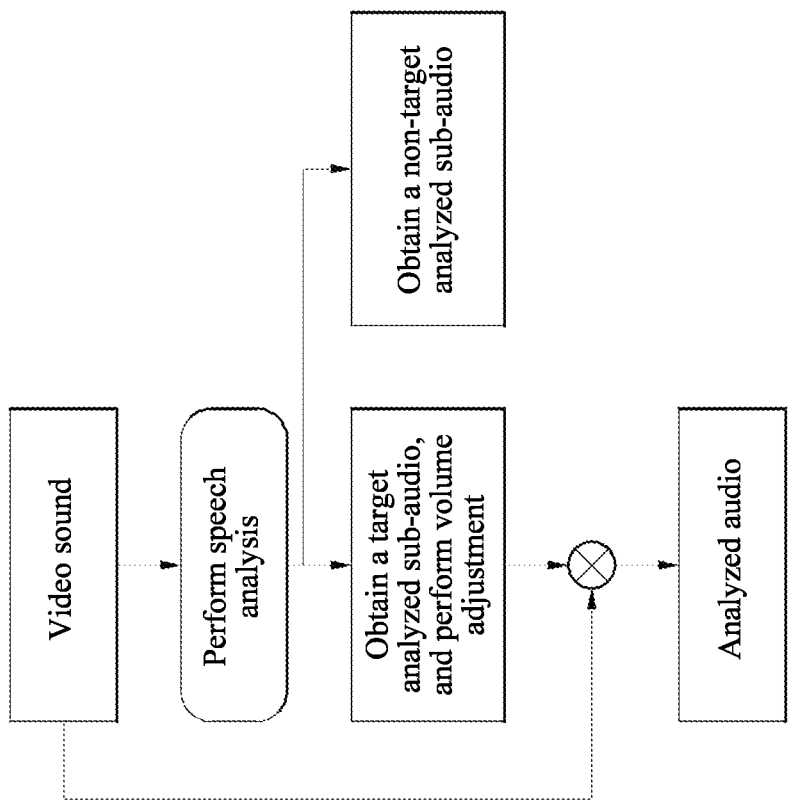
FIG. 5 is a flow chart in which a target audio subjected to volume adjustment is mixed with an original audio according to some examples of the disclosure.
Figure 6:
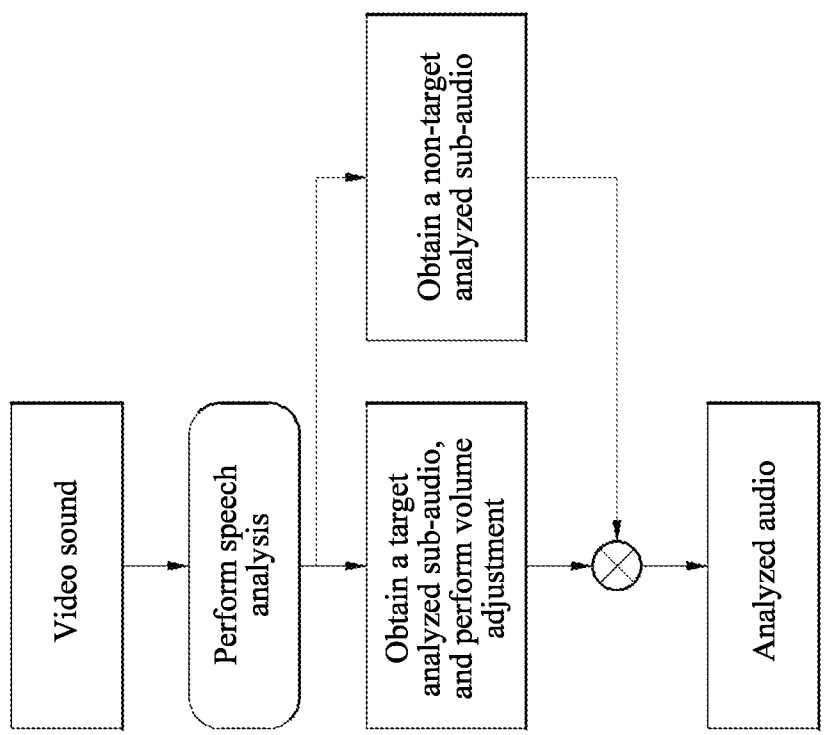
FIG. 6 is a flow chart in which a target audio subjected to volume adjustment is mixed with a non-target audio according to some examples of the disclosure.
Figure 7:
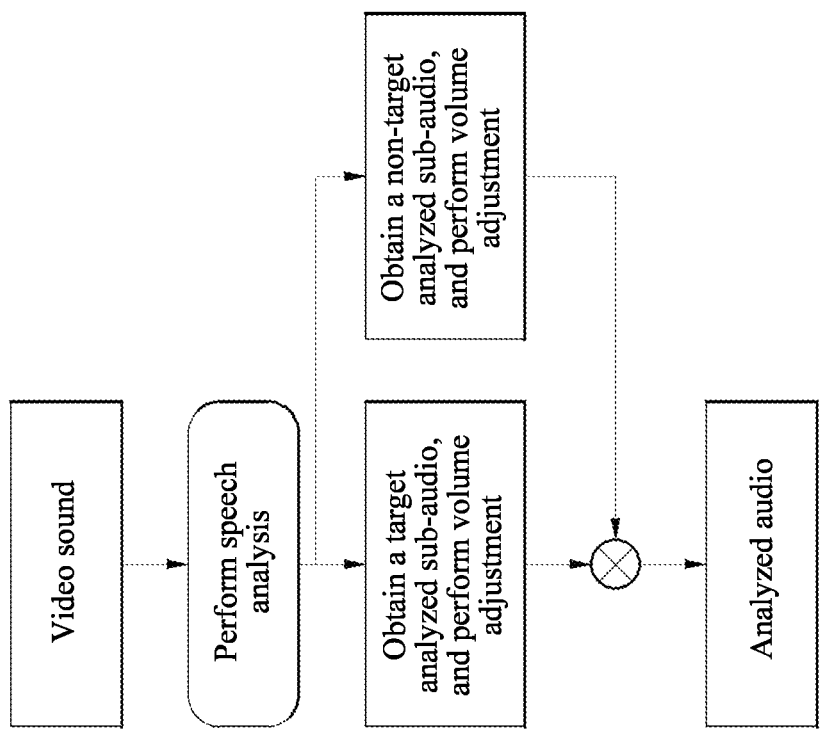
FIG. 7 is a flow chart in which a target audio and a non-target audio are respectively subjected to volume adjustment and then mixed according to some examples of the disclosure.

Referring to FIG. 5, in some examples, when the purpose of the real-time audio processing system is to adjust the volume of the target audio, after the target audio is obtained, the target audio is subjected to volume adjustment and then mixed with the original audio to obtain the analyzed audio. Alternatively, the volume of the target audio is kept unchanged, the volume of the original audio is adjusted, and then the target audio is mixed with the original audio, so that the sound sounds more natural and saturated. Referring to FIG. 6, in some examples, when the purpose of the real-time audio processing system is also to adjust the volume of the target audio, the original audio is firstly analyzed to obtain the target audio and the non-target audio. At this time, the volume of the non-target audio is unchanged, the volume of the target audio is adjusted, and then the target audio and the non-target audio are mixed to obtain the analyzed audio, so that the volume of the target audio in the analyzed audio is highlighted. FIG. 7 is different from FIG. 6 in that the volume of the non-target audio is also adjusted, or the volume of the target audio is unchanged but the volume of the non-target audio is lowered, and then the target audio is mixed with the non-target audio to obtain the analyzed audio.

As can be seen from above, the real-time audio processing system and program of the disclosure can process the audio in real time so as to meet the user's requirements for sound. Therefore, the real-time audio processing system and program are applicable to various devices that can emit sound, such as stereos, home audio-visual devices, mobile phones, etc. Besides, for smart phones and computers, the real-time audio processing program may also be obtained by downloading, so that the original device has an additional function of real-time audio processing.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A real-time audio processing system, comprising:
   a speech analysis model, configured to obtain an analysis result and hidden layer state information according to an original audio; and
   a processor, configured to:
      perform a plurality of operations on the original audio by using a separator, a window, a shifting length, and the speech analysis model, obtain a plurality of target analyzed sub-audios, perform volume adjustment on each of the target analyzed sub-audios to obtain a first analyzed audio, a second analyzed audio, a third analyzed audio, a fourth analyzed audio, and the hidden layer state information, wherein the window length is 4 times the shifting length, and the first analyzed audio, the second analyzed audio, the third analyzed audio, and the fourth analyzed audio respectively include four sub-audios;
      obtain a repeated audio section according to a sub-audio that is commonly overlapped among the first analyzed audio, the second analyzed audio, the third analyzed audio, and the fourth analyzed audio; and
      output the repeated audio section.

2. The real-time audio processing system according to claim 1, wherein the processor performs the plurality of operations on the original audio by using the speech analysis model to obtain a plurality of pieces of mask information, and the separator obtains the target analyzed sub-audios according to each of pieces of the mask information and the original audio.

3. The real-time audio processing system according to claim 2, wherein the operation is performed according to the analyzed audio, the speech analysis model and the hidden layer state information generated by the previous operation.

4. The real-time audio processing system according to claim 1, wherein the processor performs the plurality of operations on the original audio by using the speech analysis model to obtain a plurality of pieces of mask information, and the separator obtains the target analyzed sub-audios according to each of pieces of the mask information and the original audio.

5. The real-time audio processing system according to claim 4, wherein the operation is performed according to the analyzed audio, the speech analysis model and the hidden layer state information generated by the previous operation.

6. A non-transitory computer-readable recording medium, comprising a real-time audio processing program, wherein the real-time audio processing program is executed by a computer to perform the following steps:
   perform a plurality of operations on an original audio by using a separator, a window, a shifting length, and a speech analysis model, obtains a plurality of target analyzed sub-audios, performs volume adjustment on each of the target analyzed sub-audios to obtain a first analyzed audio, a second analyzed audio, a third analyzed audio, a fourth analyzed audio, and hidden layer state information, wherein the window length is 4 times the shifting length, and the first analyzed audio, the second analyzed audio, the third analyzed audio, and the fourth analyzed audio respectively include four sub-audios; and obtain a repeated audio section according to a sub-audio that is commonly overlapped among the first analyzed audio, the second analyzed audio, the third analyzed audio, and the fourth analyzed audio.

* * * * *